United States Patent
Watanabe et al.

(10) Patent No.: US 10,429,592 B2
(45) Date of Patent: Oct. 1, 2019

(54) RECEPTACLE CONNECTOR AND OPTICAL COUPLING STRUCTURE

(71) Applicant: SUMITOMO ELECTRIC INDUSTRIES, LTD., Osaka-shi, Osaka (JP)

(72) Inventors: Takuro Watanabe, Yokohama (JP); Dai Sasaki, Yokohama (JP); Osamu Shimakawa, Yokohama (JP); Hajime Arao, Yokohama (JP); Motoyoshi Kimura, Komaki (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/536,902

(22) PCT Filed: Dec. 7, 2015

(86) PCT No.: PCT/JP2015/084324
§ 371 (c)(1),
(2) Date: Jun. 16, 2017

(87) PCT Pub. No.: WO2016/104132
PCT Pub. Date: Jun. 30, 2016

(65) Prior Publication Data
US 2017/0351037 A1    Dec. 7, 2017

(30) Foreign Application Priority Data

Dec. 25, 2014   (JP) .................................. 2014-261774

(51) Int. Cl.
*G02B 6/38* (2006.01)
*G02B 6/32* (2006.01)
*G02B 6/36* (2006.01)

(52) U.S. Cl.
CPC ............. *G02B 6/3847* (2013.01); *G02B 6/32* (2013.01); *G02B 6/36* (2013.01); *G02B 6/3885* (2013.01);
(Continued)

(58) Field of Classification Search
None
See application file for complete search history.

(56) References Cited

U.S. PATENT DOCUMENTS 4,632,505 A    12/1986  Allsworth
5,170,454 A *  12/1992  Kanai ...................... G02B 6/32
                                               362/574
(Continued)

FOREIGN PATENT DOCUMENTS

JP    H05-72444 A      3/1993
JP    2003-255185 A    9/2003
(Continued)

*Primary Examiner* — Andrew Jordan
(74) *Attorney, Agent, or Firm* — Drinker Biddle & Reath LLP

(57) ABSTRACT

A receptacle connector comprises a receptacle ferrule, and a receptacle housing including a cavity housing the receptacle ferrule and a cavity housing a plug connector. The receptacle ferrule includes an optical coupling surface (front surface). An opening area of the cavity on a cross section vertical to an inserting direction of the plug connector to the receptacle housing is smaller than an opening area of the cavity on the cross section vertical to the inserting direction. In a second state after being optically coupled, the optical coupling surface (front surface) is positioned inside the cavity.

10 Claims, 12 Drawing Sheets

(52) U.S. Cl.
CPC .......... *G02B 6/3893* (2013.01); *G02B 6/3821* (2013.01); *G02B 6/3825* (2013.01); *G02B 6/3882* (2013.01)

(56) References Cited

U.S. PATENT DOCUMENTS

| | | | | |
|---|---|---|---|---|
| 5,241,612 | A * | 8/1993 | Iwama | G02B 6/32 385/59 |
| 8,297,850 | B2 * | 10/2012 | Nishioka | G02B 6/3829 385/100 |
| 9,551,835 | B2 * | 1/2017 | Sasaki | G02B 6/3825 |
| 9,551,841 | B2 * | 1/2017 | Bradley | G02B 6/3807 |
| 9,606,300 | B2 * | 3/2017 | Sasaki | G02B 6/3825 |
| 9,618,705 | B2 * | 4/2017 | Sasaki | G02B 6/3885 |
| 9,891,386 | B2 * | 2/2018 | Little | G02B 6/3817 |
| 9,921,372 | B2 * | 3/2018 | Fortusini | G02B 6/3849 |
| 2008/0107381 | A1 * | 5/2008 | Nishioka | G02B 6/3829 385/60 |
| 2010/0247043 | A1 * | 9/2010 | Sugawara | G02B 6/4201 385/93 |
| 2011/0116745 | A1 * | 5/2011 | Nishioka | G02B 6/3829 385/60 |
| 2014/0064667 | A1 * | 3/2014 | Isenhour | G02B 6/3885 385/76 |
| 2014/0153875 | A1 | 6/2014 | Bradley et al. | |
| 2014/0321814 | A1 * | 10/2014 | Chen | G02B 6/32 385/79 |
| 2015/0110444 | A1 | 4/2015 | Tanaka et al. | |
| 2016/0139339 | A1 * | 5/2016 | Sasaki | G02B 6/3825 385/59 |
| 2016/0139342 | A1 * | 5/2016 | Sasaki | G02B 6/3825 385/60 |
| 2016/0187595 | A1 * | 6/2016 | Sasaki | G02B 6/3885 385/59 |
| 2017/0351037 | A1 * | 12/2017 | Watanabe | G02B 6/3847 |

FOREIGN PATENT DOCUMENTS

| | | |
|---|---|---|
| JP | 2011-221374 A | 11/2011 |
| JP | 2012-22102 A | 2/2012 |
| JP | 2014-521996 A | 8/2014 |
| WO | WO-2013/019622 A2 | 2/2013 |
| WO | WO 2014/003063 | 1/2014 |
| WO | WO 2014/035853 | 3/2014 |

\* cited by examiner

RECEPTACLE CONNECTOR AND OPTICAL COUPLING STRUCTURE

TECHNICAL FIELD

The present invention relates to a receptacle connector and an optical coupling structure.

BACKGROUND

Patent Literature 1 discloses an optical connector structure for optically coupling two optical fiber groups with each other. The optical connector structure includes a pair of ferrules for holding the respective optical fiber groups. Each of the pair of ferrules includes a lens for collimating light emitted from an optical fiber and converging light to be made incident on the optical fiber.

CITATION LIST

Patent Literature

Patent Literature 1: U.S. Patent Application Publication No. 2014/0153875

SUMMARY

Technical Problem

In a structure described in Patent Literature 1, a housing that houses one ferrule includes a wide opening part for introducing a housing that houses the other ferrule. Then, an optical coupling part of the pair of ferrules is provided inside the wide opening part. However, in such a structure, dirt and dust may intrude from the wide opening part and stick to the optical coupling part. Sticking of the dirt and dust to the optical coupling part causes decline of optical coupling efficiency. An object of the present invention is to provide a receptacle connector and an optical coupling structure capable of reducing sticking of dirt and dust to an optical coupling part.

Solution to Problem

A receptacle connector according to one embodiment of the present invention is a receptacle connector holding an end of a first optical fiber and optically coupling the first optical fiber and a second optical fiber by being connected with a plug connector holding an end of the second optical fiber, and comprises: a receptacle ferrule; and a receptacle housing including a first cavity housing the receptacle ferrule and a second cavity housing the plug connector. The receptacle ferrule includes a front end, a holding part holding the end of the first optical fiber, and a receptacle interface part optically coupled with the end of the first optical fiber, facing a plug interface part of the plug connector, enlarging a light beam emitted from the first optical fiber and emitting the light beam from the front end. An opening area of the first cavity on a cross section vertical to an inserting direction of the plug connector to the receptacle housing is smaller than an opening area of the second cavity on the cross section vertical to the inserting direction. The receptacle interface part and the plug interface part define a first state before being optically coupled and a second state after being optically coupled, and the receptacle interface part is positioned inside the first cavity in the second state.

An optical coupling structure according to one embodiment of the present invention is an optical coupling structure comprising the receptacle connector and the plug connector, the plug connector includes a plug ferrule including the plug interface part and a plug housing housing the plug ferrule. The plug interface part is optically coupled with the receptacle interface part, and a distal end of the plug housing is positioned inside the second cavity and the plug interface part is positioned inside the first cavity, in the second state.

Advantageous Effects of Invention

The receptacle connector and the optical coupling structure of the present invention can reduce sticking of dirt and dust to an optical coupling part.

DETAILED DESCRIPTION

Figure 1:
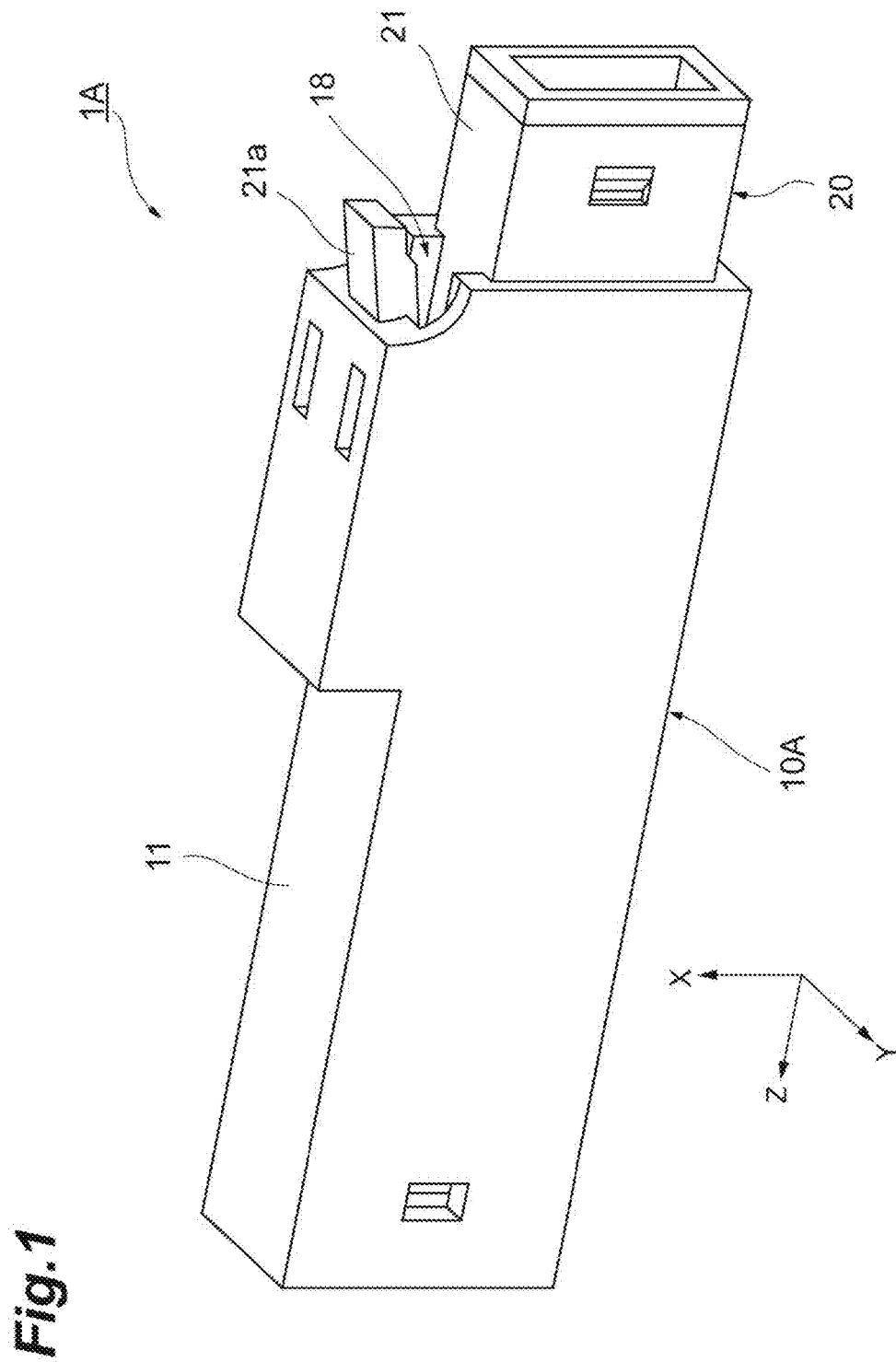
FIG. 1 is a perspective view illustrating an optical coupling structure according to a first embodiment of the present invention.

[Description of Embodiments of the Present Invention]

Content of the embodiments of the present invention will be listed and described first. A receptacle connector according to one embodiment of the present invention is a receptacle connector holding an end of a first optical fiber and optically coupling the first optical fiber and a second optical fiber by being connected with a plug connector holding an end of the second optical fiber, and comprises: a receptacle ferrule; and a receptacle housing including a first cavity housing the receptacle ferrule and a second cavity housing the plug connector. The receptacle ferrule includes a front end, a holding part holding the end of the first optical fiber, and a receptacle interface part optically coupled with the end of the first optical fiber, facing a plug interface part of the plug connector, enlarging a light beam emitted from the first optical fiber and emitting the light beam from the front end. An opening area of the first cavity on a cross section vertical to an inserting direction of the plug connector to the receptacle housing is smaller than an opening area of the second cavity on the cross section vertical to the inserting direction.

The receptacle interface part and the plug interface part define a first state before being optically coupled and a second state after being optically coupled, and the receptacle interface part is positioned inside the first cavity in the second state.

In the receptacle connector, the receptacle interface part of the receptacle ferrule is positioned not in the second cavity with the wide opening area but in the first cavity with the narrow opening area, the first cavity positioned more at a back of the receptacle housing than the second cavity, where dirt and dust do not easily intrude. Therefore, sticking of the dirt and the dust to an optical coupling part of the receptacle interface part and the plug interface part is reduced and decline of optical coupling efficiency can be suppressed.

In the receptacle connector, the receptacle interface part may be positioned inside the first cavity also in the first state. Thus, even before optically coupling the receptacle interface part and the plug interface part, the sticking of the dirt and the dust to the receptacle interface part can be reduced.

In the receptacle connector, in the second state, compared to the first state, a position of the receptacle interface part in the inserting direction may be moved to an opposite side to the plug connector. Thus, the optical coupling part of the receptacle interface part and the plug interface part can be easily arranged inside the deep first cavity with the narrow opening area.

In the receptacle connector, an inner wall of the receptacle housing may include a part holding the receptacle interface part inside the first cavity by being in contact with the receptacle ferrule. Thus, the optical coupling part of the receptacle interface part and the plug interface part can be easily arranged inside the deep first cavity with the narrow opening area. Further, the opening area of the first cavity is narrowed further by the part of the receptacle housing in contact with the receptacle ferrule, and intrusion of the dirt and the dust can be more effectively reduced.

In the receptacle connector, the receptacle housing may further include a spacer provided between the receptacle interface part and the plug interface part, and in the second state, compared to the first state, a relative position of the spacer to the receptacle interface part in the inserting direction may be moved to the receptacle interface part side.

In the receptacle connector, the spacer is urged toward the second cavity, and the inner wall of the receptacle housing may include a part holding the receptacle interface part inside the first cavity by being in contact with the spacer. Thus, the optical coupling part of the receptacle interface part and the plug interface part can be easily arranged inside the deep first cavity with the narrow opening area. Further, the opening area of the first cavity is narrowed further by the part of the receptacle housing in contact with the spacer, and the intrusion of the dirt and the dust can be more effectively reduced.

The receptacle connector may further comprise a support member arranged at a position where the receptacle ferrule is pinched with the plug connector in the inserting direction, the support member supporting the receptacle ferrule and restricting movement of the receptacle ferrule to the opposite side to the plug connector and a first elastic member arranged between the support member and the receptacle ferrule, and the first elastic member may be contracted more in the second state than in the first state. Thus, a structure of moving the position of the receptacle interface part in the inserting direction to the opposite side to the plug connector can be easily realized.

The receptacle connector may further comprise a second elastic member arranged at the position where the receptacle ferrule is pinched with the plug connector in the inserting direction, the second elastic member supporting the receptacle ferrule and being fixed to the receptacle housing, and the second elastic member may be contracted more in the second state than in the first state. Thus, the structure of moving the position of the receptacle interface part in the inserting direction to the opposite side to the plug connector can be easily realized.

In the receptacle connector, the second cavity may house at least a part of a latch lever of the plug connector. Thus, a gap between the second cavity and the plug connector is narrowed by the latch lever, and the intrusion of the dirt and the dust can be more effectively reduced.

The receptacle connector may further comprise a rod-like guide pin to position the receptacle ferrule and the plug ferrule by inserting a part into a first guide pin hole of the receptacle ferrule and inserting the other one part into a second guide pin hole of the plug ferrule, the first optical fiber may be a single mode optical fiber, and a difference between an outer diameter of the guide pin and an inner diameter of the first guide pin hole and the second guide pin hole may be a difference used for connection of a multimode optical fiber. In the receptacle connector, a diameter of the light beam emitted from the receptacle interface part and a diameter of the light beam made incident on the receptacle interface part are larger than a diameter on an end face of the first optical fiber. Thus, since relative position accuracy of the receptacle interface part and the plug interface part is mitigated, the guide pin for the multimode optical fiber can be used as described above. Thus, tolerance of the guide pin can be increased and a manufacturing cost can be reduced.

An optical coupling structure according to one embodiment of the present invention is an optical coupling structure comprising any one of the receptacle connectors and the plug connector, the plug connector includes a plug ferrule including the plug interface part and a plug housing housing the plug ferrule. The plug interface part is optically coupled with the receptacle interface part, and a distal end of the plug housing is positioned inside the second cavity and the plug interface part is positioned inside the first cavity, in the second state. According to the optical coupling structure, by including any one of the receptacle connectors, the sticking of the dirt and the dust to the optical coupling part of the receptacle interface part and the plug interface part can be reduced, and decline of the optical coupling efficiency can be suppressed. Since the distal end of the plug housing is positioned inside the second cavity and the plug interface part is positioned inside the first cavity in the second state, a structure is such that the plug interface part is projected from the distal end of the plug housing. Therefore, cleaning of the plug interface part is facilitated.

[Details of Embodiments of the Present Invention]

Hereinafter, one aspect of the receptacle connector and the optical coupling structure of the present invention will be described in detail with reference to attached drawings. In the description of the drawings, same signs are attached to same elements, and redundant description is omitted. In the drawings, an XYZ rectangular coordinate system is illustrated in the drawings.

FIG. 1 is a perspective view illustrating an optical coupling structure 1A according to a first embodiment of the present invention. The optical coupling structure 1A includes a receptacle connector 10A and a plug connector 20. The receptacle connector 10A holds an end of a first optical fiber to be described later, and optically couples the first optical fiber and a second optical fiber by being connected with the plug connector 20 holding an end of the second optical fiber. The receptacle connector 10A includes a receptacle housing 11 roughly in a rectangular parallelepiped shape. The receptacle housing 11 includes a cavity 18 (second cavity) housing the plug connector 20. The cavity 18 extends in the inserting direction (Z direction) of the plug connector 20, and the cross section (XY cross section) of the cavity 18 vertical to the inserting direction is roughly rectangular. Furthermore, the plug connector 20 includes a plug housing 21 roughly in a rectangular parallelepiped shape. A latch lever 21a is provided on one outer side face of the plug housing 21. The cavity 18 houses at least a part of the latch lever 21a, and a latch engaging part to engage with the latch lever 21a is provided on one inner side face of the cavity 18. When the plug connector 20 is inserted into the cavity 18, the latch lever 21a and the latch engaging part engage with each other and thus, getting-out of the plug connector 20 is prevented.

Figure 2:
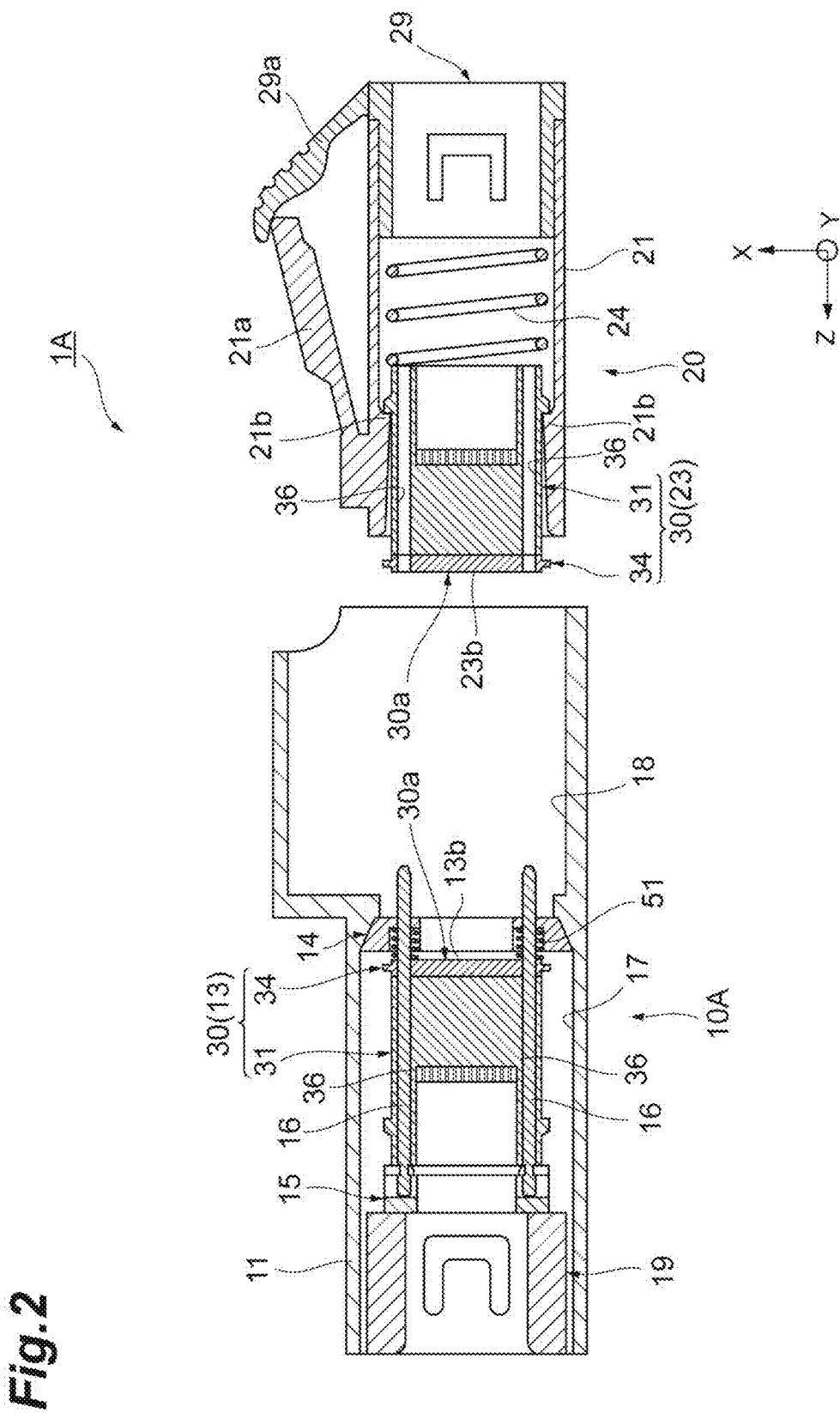
FIG. 2 illustrates a cross section in a first state of the optical coupling structure along an inserting direction.
Figure 3:
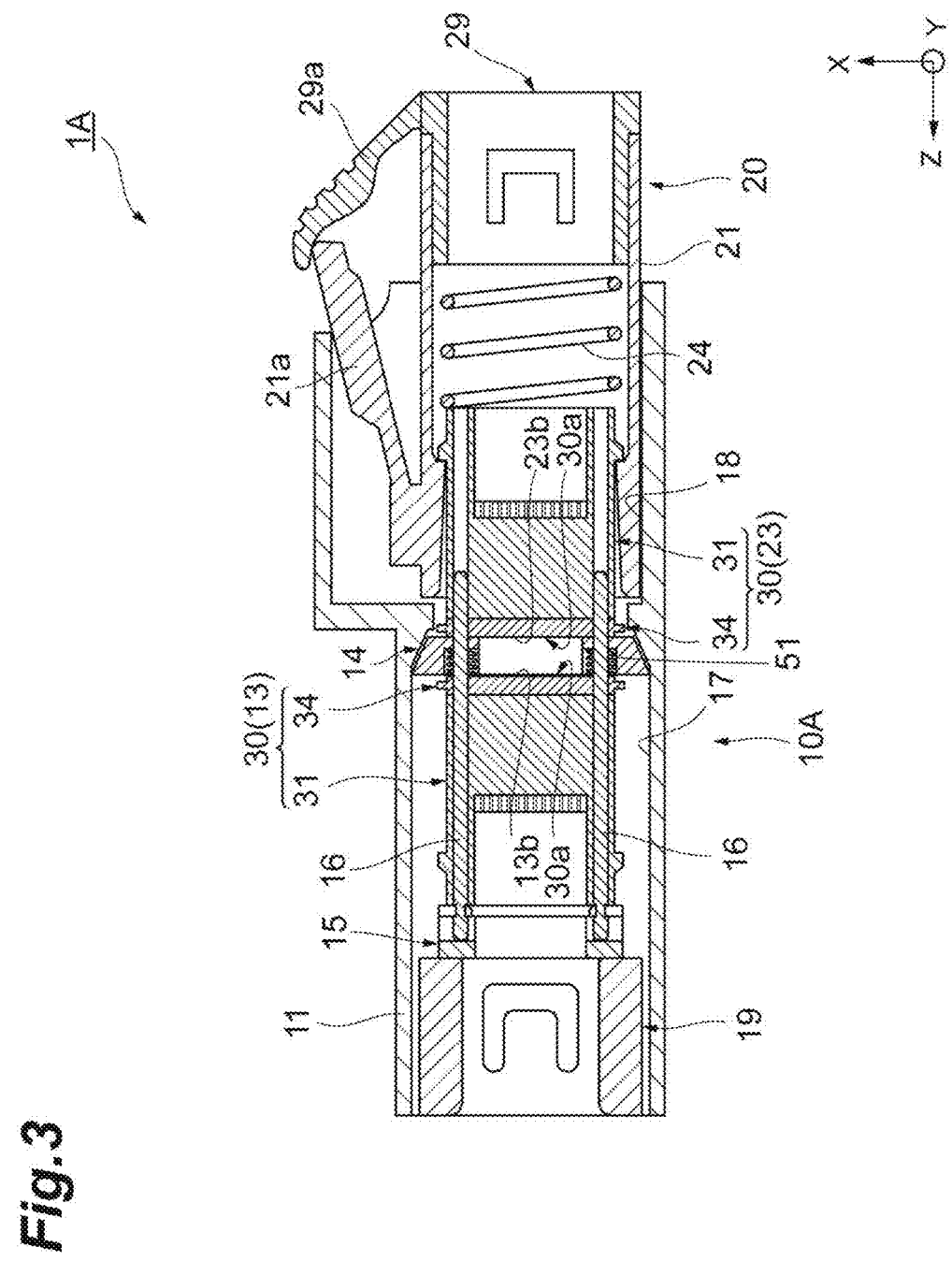
FIG. 3 illustrates a cross section in a second state of the optical coupling structure along the inserting direction.

FIG. 2 and FIG. 3 illustrate a cross section of the optical coupling structure 1A along the inserting direction. FIG. 2 illustrates a state (referred to as the first state, hereinafter) before the plug connector 20 is inserted into the receptacle connector 10A, and FIG. 3 illustrates a state (referred to as the second state, hereinafter) that the plug connector 20 is inserted into the receptacle connector 10A.

As illustrated in FIG. 2 and FIG. 3, the receptacle connector 10A further includes, in addition to the receptacle housing 11, a receptacle ferrule 13, a spacer 14, a pin keeper 15, two rod-like guide pins 16 and a support member 19. Furthermore, the receptacle housing 11 includes, in addition to the cavity 18, a cavity 17 (first cavity) housing the receptacle ferrule 13. The plug connector 20 further includes a plug ferrule 23 housed in the plug housing 21 in addition to the plug housing 21.

Figure 4:
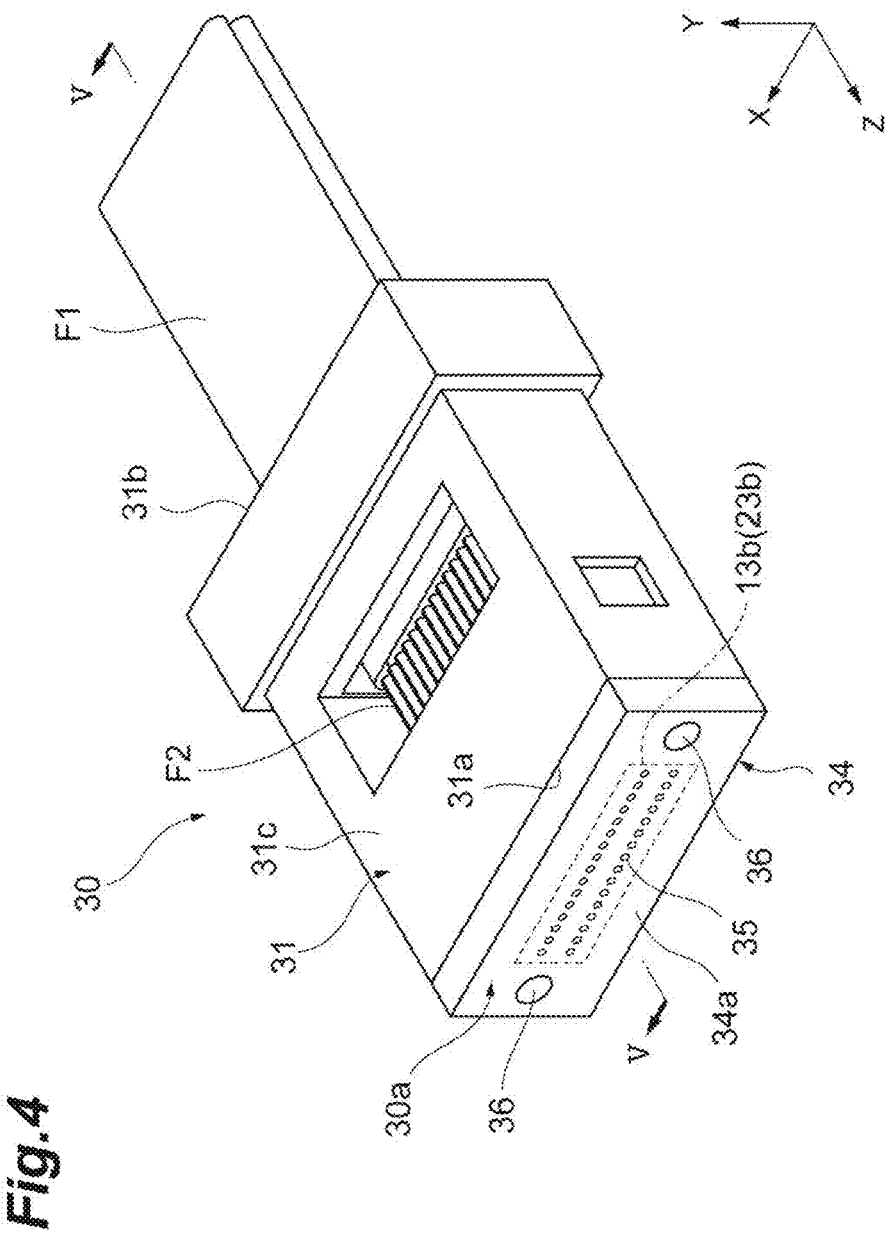
FIG. 4 is a perspective view illustrating a ferrule suitably used as a receptacle ferrule and a plug ferrule.
Figure 5:
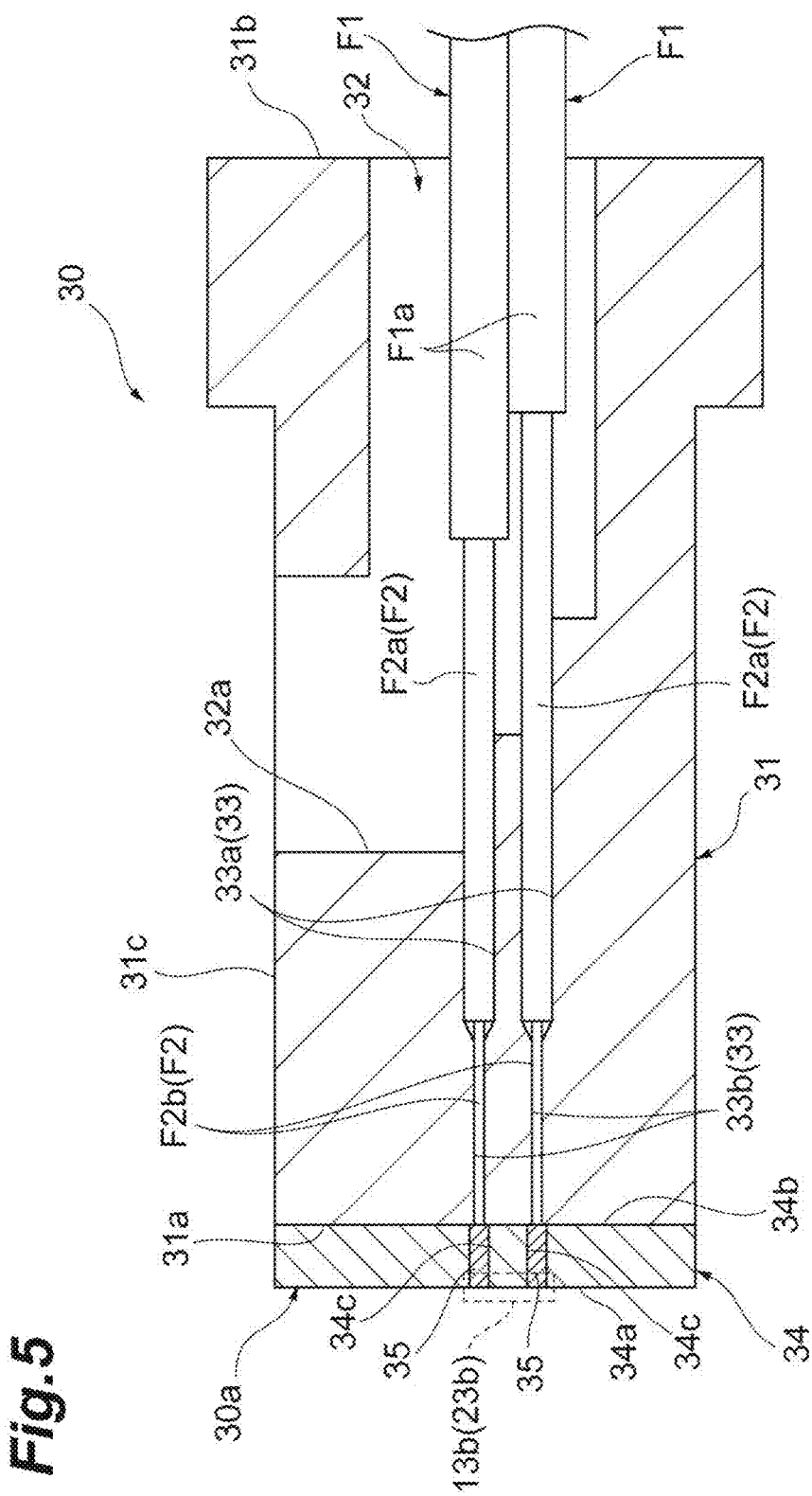
FIG. 5 is a sectional view along a V-V line in FIG. 4.

The receptacle ferrule 13 and the plug ferrule 23 have the mutually same configuration. FIG. 4 is a perspective view illustrating a ferrule 30 suitably used as the receptacle ferrule 13 and the plug ferrule 23. FIG. 5 is a sectional view along a V-V line in FIG. 4. As illustrated in FIG. 4 and FIG. 5, the ferrule 30 includes a ferrule main body part 31, and a GRIN lens array 34. In the receptacle ferrule 13, the ferrule main body part 31 includes a holding hole 33 that is a holding part holding an end of an optical fiber F2. The GRIN lens array 34 includes a receptacle interface part 13b optically coupled with the end of the optical fiber F2 and enlarging and emitting the light beam emitted from the optical fiber F2. Thus, the ferrule 30 as the receptacle ferrule 13 includes the receptacle interface part 13b at a front end 30a, and the enlarged light beam is emitted from the front end 30a. Also in the plug ferrule 23, the ferrule main body part 31 includes a holding part, and the GRIN lens array 34 includes a plug interface part 23b.

The ferrule main body part 31 is a so-called MT ferrule, and has a roughly rectangular parallelepiped outer shape. Specifically, the ferrule main body part 31 includes a front end face 31a, a rear end face 31b, and a side face 31c. The front end face 31a and the rear end face 31b extend along an XY plane respectively, and face each other in a Z direction. The side face 31c extends along a ZX plane, and connects the front end face 31a and the rear end face 31b.

The ferrule main body part 31 holds the ends of the plurality of optical fibers F2 configuring an optical cable F1. The optical fiber F2 corresponds to a first optical fiber in the receptacle ferrule 13, and the optical fiber F2 corresponds to a second optical fiber in the plug ferrule 23. On the rear end face 31b of the ferrule main body part 31, an introducing part 32 (see FIG. 5) for introducing the optical cable F1 is opened. The introducing part 32 holds the optical cable F1 formed by integrating the plurality of optical fibers F2. The introducing part 32 passes through toward the front end face 31a, and includes a window 32a opened to the side face 31c in the middle of passing through. The introducing part 32 includes the plurality of holding holes 33 provided to individually hold the optical fiber F2 in front of the window 32a. The holding hole 33 includes a large diameter part 33a on the window 32a side, and a small diameter part 33b on the front end face 31a side. The large diameter part 33a holds a resin coated part F2a of the part of the optical fiber F2 from which a coating resin F1a for integrating the plurality of optical fibers F2 is removed. The small diameter part 33b holds a bare fiber part F2b of the optical fiber F2 from which the resin coating is also removed. An inner diameter of the small diameter part 33b is smaller than an inner diameter of the large diameter part 33a. As illustrated in FIG. 5, a distal end of the bare fiber part F2b is exposed at the front end face 31a.

The optical cable F1 and the plurality of optical fibers F2 configuring the optical cable F1 are inserted from the rear of the ferrule main body part 31 to be held by the introducing part 32, and are fixed by curing of an adhesive agent introduced from the window 32a. The front end face 31a is polished and a distal end face of the optical fiber F2 exposed at the front end face 31a becomes flat. The optical fiber F2 may be a single mode optical fiber or a multimode optical fiber, or may be an optical fiber of other kinds.

The GRIN lens array 34 is fixed to the front end face 31a of the ferrule main body part 31 by bonding. The GRIN lens array 34 includes a front surface 34a having the receptacle interface part 13b (or the plug interface part 23b), and a back surface 34b facing the front end face 31a of the ferrule main body part 31. The receptacle interface part 13b is arranged on the end face (front end 30a) of the receptacle ferrule 13, and the plug interface part 23b is arranged on the end face (front end 30a) of the plug ferrule 23. The receptacle interface part 13b and the plug interface part 23b face each other, and define the first state (see FIG. 2) before being optically coupled, and the second state (see FIG. 3) after being optically coupled.

The GRIN lens array 34 includes a plurality of GRIN lenses (optical elements) 35 optically coupled with the plurality of optical fibers F2 respectively. The plurality of GRIN lenses 35 are arranged in an array shape within the XY plane, and respectively bonded and fixed to a plurality of lens holding holes 34c (see FIG. 5) passing through from the back surface 34b to the front surface 34a. The plurality of GRIN lenses 35 are optically coupled with the end of the corresponding optical fiber F2 respectively, enlarge the light beam emitted from the optical fiber F2, and emit the light beam from the receptacle interface part 13b (or the plug interface part 23b). The enlarged beam emitted from the plug interface part 23b (or the receptacle interface part 13b) is received in the receptacle interface part 13b (or the plug interface part 23b), converged at the GRIN lenses 35, and coupled to the optical fiber F2. The plurality of GRIN lenses 35 are, for example, graded index fibers configured such that a refractive index declines gradually from a center to an outer periphery.

The front surface 34a and the back surface 34b of the GRIN lens array 34 are smoothed by polishing treatment. The back surface 34b is bonded and fixed to the front end face 31a of the ferrule main body part 31 in the state that the respective optical fibers F2 and the respective GRIN lenses 35 are optically coupled with each other.

As illustrated in FIG. 4, the ferrule 30 further includes two guide pin holes 36. The guide pin holes 36 extend in the Z direction, and are lined in an X direction and formed to hold the plurality of optical fibers F2 in between. The guide pin hole 36 is formed by communicating a guide pin hole formed at the ferrule main body part 31 and a guide pin hole formed at the GRIN lens array 34 in the Z direction. The guide pin hole 36 corresponds to a first guide pin hole in the receptacle ferrule 13, and the guide pin hole 36 corresponds to a second guide pin hole in the plug ferrule 23.

A part (front part) of the guide pin 16 illustrated in FIG. 2 and FIG. 3 is inserted into the guide pin hole 36 of the receptacle ferrule 13, and the other one part (rear part) of the guide pin 16 is inserted into the guide pin hole 36 of the plug ferrule 23. Thus, the receptacle ferrule 13 and the plug ferrule 23 can be positioned. When the optical fiber F2 is the single mode optical fiber, a difference between the outer diameter of the guide pin 16 and the inner diameter of the guide pin hole 36 may be a difference used for the connection of the multimode optical fiber.

FIG. 2 and FIG. 3 are referred to again. As described above, the receptacle housing 11 includes the cavity 17 (first cavity) and the cavity 18 (second cavity). The cavities 17 and 18 are communicated in the Z direction that is the inserting direction of the plug connector 20. The receptacle ferrule 13 is housed in the cavity 17, and the plug connector 20 is housed in the cavity 18. Then, sizes of the cavities 17 and 18 in a view from the Z direction are different from each other. That is, the opening area of the cavity 17 on the cross section (XY cross section) vertical to the inserting direction of the plug connector 20 is smaller than the opening area of the cavity 18 on the cross section (XY cross section) vertical to the inserting direction. In the present embodiment in particular, an inside dimension of the cavity 18 in the X direction is larger than an inside dimension of the cavity 17 in the same direction, for space needed for housing the latch lever 21a.

The pin keeper 15 and the support member 19 are provided inside the cavity 17. The pin keeper 15 is supported by the support member 19, and also supports the receptacle ferrule 13 by holding one end of the guide pin 16. The support member 19 is fixed to the receptacle housing 11. The support member 19 is arranged at a position where the receptacle ferrule 13 is pinched with the plug connector 20 in the Z direction, supports the receptacle ferrule 13 through the pin keeper 15, and restricts movement of the receptacle ferrule 13 to the opposite side to the plug connector 20. By such a configuration, the receptacle ferrule 13 into which the guide pin 16 is inserted is positioned inside the cavity 17.

Figure 6:
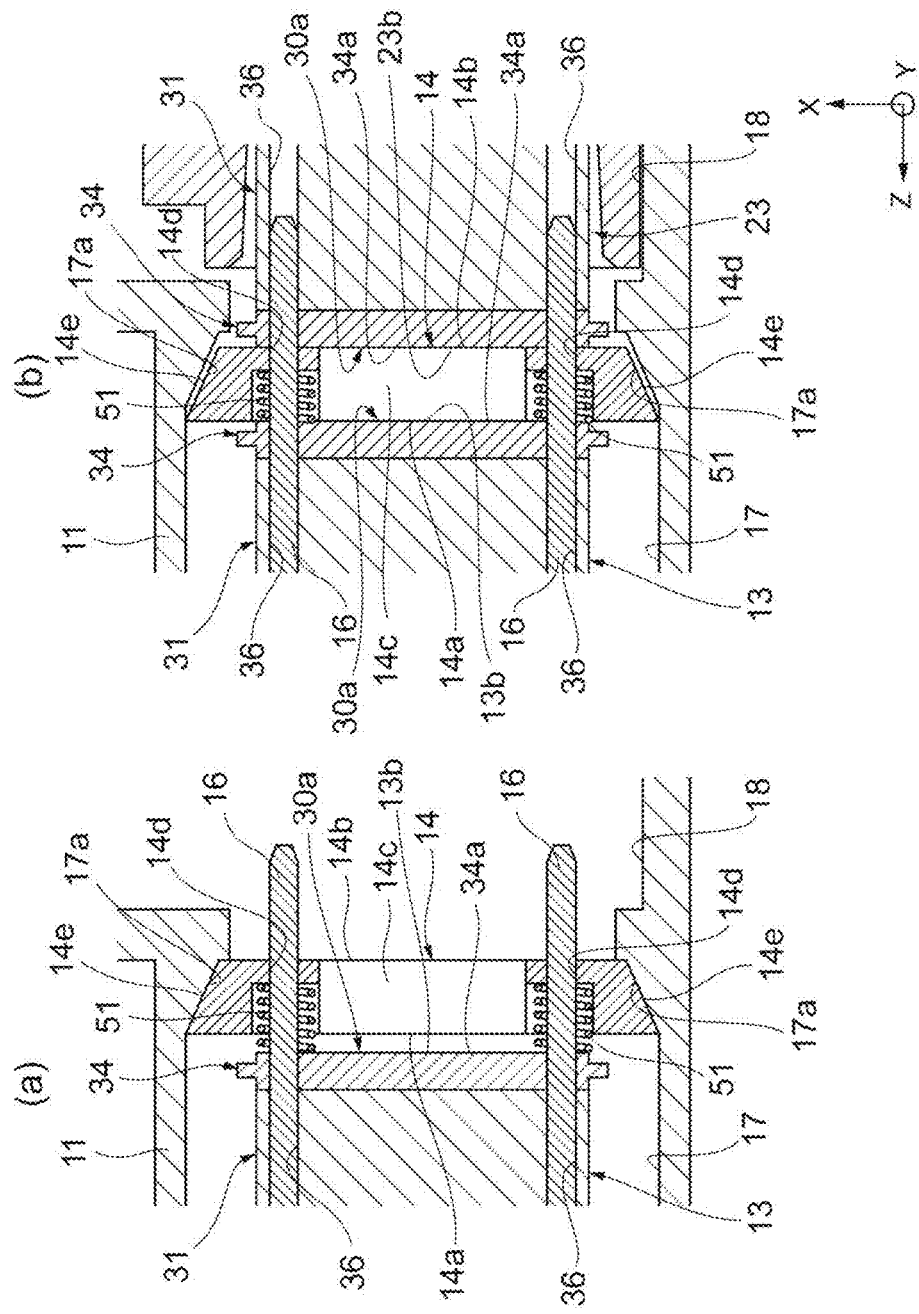
FIG. 6 is a sectional view magnifying and illustrating a vicinity of a spacer. (a) illustrates the first state and (b) illustrates the second state.

The spacer 14 is provided between the front end 30a of the receptacle ferrule 13 and the front end 30a of the plug ferrule 23, and separates the receptacle interface part 13b and the plug interface part 23b from each other. FIG. 6 is a sectional view magnifying and illustrating a vicinity of the spacer 14. FIG. 6(a) illustrates the first state, and FIG. 6(b) illustrates the second state. In the first state (see FIG. 6(a)) before the plug connector 20 is inserted, the spacer 14 is housed inside the receptacle housing 11. The spacer 14 shows a planar shape, and includes a first surface 14a and a second surface 14b facing in the Z direction. The first surface 14a faces the front end 30a of the receptacle ferrule 13, and the second surface 14b faces the front end 30a of the plug ferrule 23. The spacer 14 includes an opening 14c for making the light beam pass through at a center part within the XY plane. The opening 14c passes through from the first surface 14a to the second surface 14b, and makes the receptacle interface part 13b and the plug interface part 23b face each other.

The spacer 14 further includes two guide pin holes 14d for inserting the two guide pins 16. The guide pin holes 14d are lined in the X direction and formed to hold the opening 14c in between. In the first state, the guide pin holes 14d are communicated with the guide pin holes 36 of the receptacle ferrule 13, and the guide pins 16 are held in the state of being inserted into the guide pin holes 14d and 36. The inner diameter of one part on the first surface 14a side of the guide pin hole 14d is larger than the inner diameter of the other part on the second surface 14b side, and an elastic member 51 to be expanded and contracted in the Z direction is inserted into the one part. The elastic member 51 is a coil spring for example, and is arranged to house the guide pin 16 on the inner side. One end of the elastic member 51 is in contact with the spacer 14, and the other end of the elastic member 51 is in contact with the receptacle ferrule 13.

An outer peripheral surface 14e of the spacer 14 has a tapered shape that is gradually narrowed toward the cavity 18. Then, on the inner wall of the cavity 17 of the receptacle housing 11, a surface 17a to be in contact with the outer peripheral surface 14e of the spacer 14 is formed. Thus, in the first state illustrated in FIG. 6(a), the elastic member 51 urges the spacer 14 toward the cavity 18, and by the surface 17a being in contact with the outer peripheral surface 14e, the receptacle interface part 13b is positioned inside the cavity 17. The first surface 14a of the spacer 14 and the receptacle interface part 13b are separated from each other. Then, in the second state illustrated in FIG. 6(b), by the spacer 14 being pushed by the plug ferrule 23, compared to the first state, the relative position of the spacer 14 to the receptacle interface part 13b in the Z direction is moved to the receptacle interface part 13b side. The outer peripheral surface 14e of the spacer 14 and the surface 17a are separated from each other. Even in the state, the receptacle interface part 13b is positioned inside the cavity 17.

FIG. 2 and FIG. 3 are referred to again. The plug connector 20 further includes, in addition to the plug housing 21 and the plug ferrule 23, an elastic member 24 and a support member 29. The support member 29 is fixed to an inner rear end of the plug housing 21. The support member 29 includes a latch restricting part 29a for restricting the latch lever 21a of the plug housing 21 so as not to be widened too much.

The elastic member 24 is, for example, a coil spring to be expanded and contracted in the Z direction, and is arranged between the plug ferrule 23 and the support member 29 inside the plug housing 21. The elastic member 24 urges the plug ferrule 23 to the front (direction to the receptacle ferrule 13). It is preferable that elastic force of the elastic member 24 is greater than elastic force of the elastic member 51 (see FIG. 4) provided in the spacer 14. On an inner surface of the plug housing 21, a part 21b is provided. The part 21b is in contact with a projection formed on a side face of the ferrule main body part 31 of the plug ferrule 23. Thus, the plug ferrule 23 is held inside the plug housing 21 while being urged by the elastic member 24. The plug interface part 23b is projected from the front end of the plug housing 21.

When the plug connector 20 illustrated in FIG. 2 is inserted into the cavity 18 of the receptacle housing 11, the guide pins 16 are inserted into the guide pin holes 36 of the plug ferrule 23. Thus, the receptacle ferrule 13 and the plug ferrule 23 are positioned within the XY plane.

When the plug ferrule 23 is inserted further in the state that the guide pins 16 are inserted into the plug ferrule 23, as illustrated in FIG. 3, the plug interface part 23b is brought into contact with the second surface 14b of the spacer 14. Then, when the plug ferrule 23 is inserted further, the elastic member 51 is contracted, and the position of the second surface 14b in the Z direction is moved to the receptacle ferrule 13 side. Then, the first surface 14a of the spacer 14 is brought into contact with the receptacle interface part 13b. In the state, the latch lever 21a engages with the latch engaging part, and the receptacle connector 10A and the plug connector 20 are connected to each other. Since a gap is generated between the receptacle ferrule 13 and the spacer 14 and the receptacle housing 11, and between the plug ferrule 23 and the plug housing 21, the receptacle ferrule 13 and the plug ferrule 23 are turned to a floating state, and the configuration becomes such that external force is not easily transmitted to the coupling part.

The plug interface part 23b is projected more than the front end of the plug housing 21 so that the plug interface part 23b advances into the cavity 17, and is optically coupled with the receptacle interface part 13b. Thus, the distal end of the plug housing 21 is positioned inside the cavity 18, and the receptacle interface part 13b is positioned inside the cavity 17.

Effects obtained by the optical coupling structure 1A and the receptacle connector 10A according to the present embodiment will be described. In the receptacle connector 10A, the receptacle interface part 13b is positioned not in the cavity 18 with the wide opening area but in the cavity 17 with the narrow opening area, the cavity 17 positioned more at the back of the receptacle housing 11 than the cavity 18, where the dirt and the dust do not easily intrude. Therefore, the sticking of the dirt and the dust to the optical coupling part of the receptacle interface part 13b and the plug interface part 23b is reduced and the decline of the optical coupling efficiency can be suppressed.

As in the present embodiment, the receptacle interface part 13b may be positioned inside the cavity 17 also in the first state. Thus, even before optically coupling the receptacle interface part 13b and the plug interface part 23b, the sticking of the dirt and the dust to the receptacle interface part 13b can be reduced.

As in the present embodiment, the receptacle housing 11 may include the spacer 14 between the receptacle interface part 13b and the plug interface part 23b, and in the second state, compared to the first state, the relative position of the spacer 14 to the receptacle interface part 13b in the Z direction may be moved to the receptacle interface part 13b side. Thus, the floating state of the receptacle ferrule 13 and the plug ferrule 23 can be suitably realized. The spacer 14 can be configured by a planar member, and a structure of the spacer 14 is simplified. Both in the first state and in the second state, the optical coupling part of the receptacle interface part 13b and the plug interface part 23b can be easily arranged at the back of the receptacle housing 11.

As in the present embodiment, the spacer 14 is urged toward the cavity 18, and the inner wall of the receptacle housing 11 may include the part (surface 17a) holding the receptacle interface part 13b inside the cavity 17 by being in contact with the spacer 14. Thus, the optical coupling part of the receptacle interface part 13b and the plug interface part 23b can be easily arranged inside the deep cavity 17 with the narrow opening area. Further, the opening area of the cavity 17 is narrowed further by the part (surface 17a) of the receptacle housing 11 in contact with the spacer 14, and the intrusion of the dirt and the dust can be more effectively reduced. It is preferable that the elastic force of the elastic member 51 urging the spacer 14 toward the cavity 18 is smaller than the elastic force of the elastic member 24 provided in the plug connector 20. Thus, the spacer 14 is surely moved back, and the receptacle ferrule 13 and the plug ferrule 23 can be turned to the floating state.

As in the present embodiment, the cavity 18 may house at least a part of the latch lever 21a. Thus, the gap between the cavity 18 and the plug connector 20 is narrowed by the latch lever 21a, and the intrusion of the dirt and the dust can be more effectively reduced.

As in the present embodiment, in the case that the optical fiber F2 is the single mode optical fiber, the difference between the outer diameter of the guide pin 16 and the inner diameter of the guide pin hole 36 may be the difference used for the connection of the multimode optical fiber. In the receptacle connector 10A of the present embodiment, by the GRIN lenses 35, the diameter of the light beam emitted from the receptacle interface part 13b and the diameter of the light beam made incident on the receptacle interface part 13b are larger than the diameter on the distal end face of the optical fiber F2, and the light beam is transferred between the receptacle interface part 13b and the plug interface part 23b in such a large diameter. Thus, since the relative position accuracy of the receptacle interface part 13b and the plug interface part 23b is mitigated, the guide pin 16 for the multimode optical fiber can be used as described above. Thus, the tolerance of the guide pin 16 can be increased and the manufacturing cost can be reduced.

As in the present embodiment, the distal end of the plug housing 21 may be positioned inside the cavity 18 and the plug interface part 23b may be positioned inside the cavity 17 in the second state. Thus, the structure is such that the plug interface part 23b is projected from the distal end of the plug housing 21. Therefore, the cleaning of the plug interface part 23b is facilitated. Thus, since an opening part of the cavity 17 is narrowed further by the plug ferrule 23, the intrusion of the dirt and the dust can be more effectively reduced in the second state.

Figure 7:
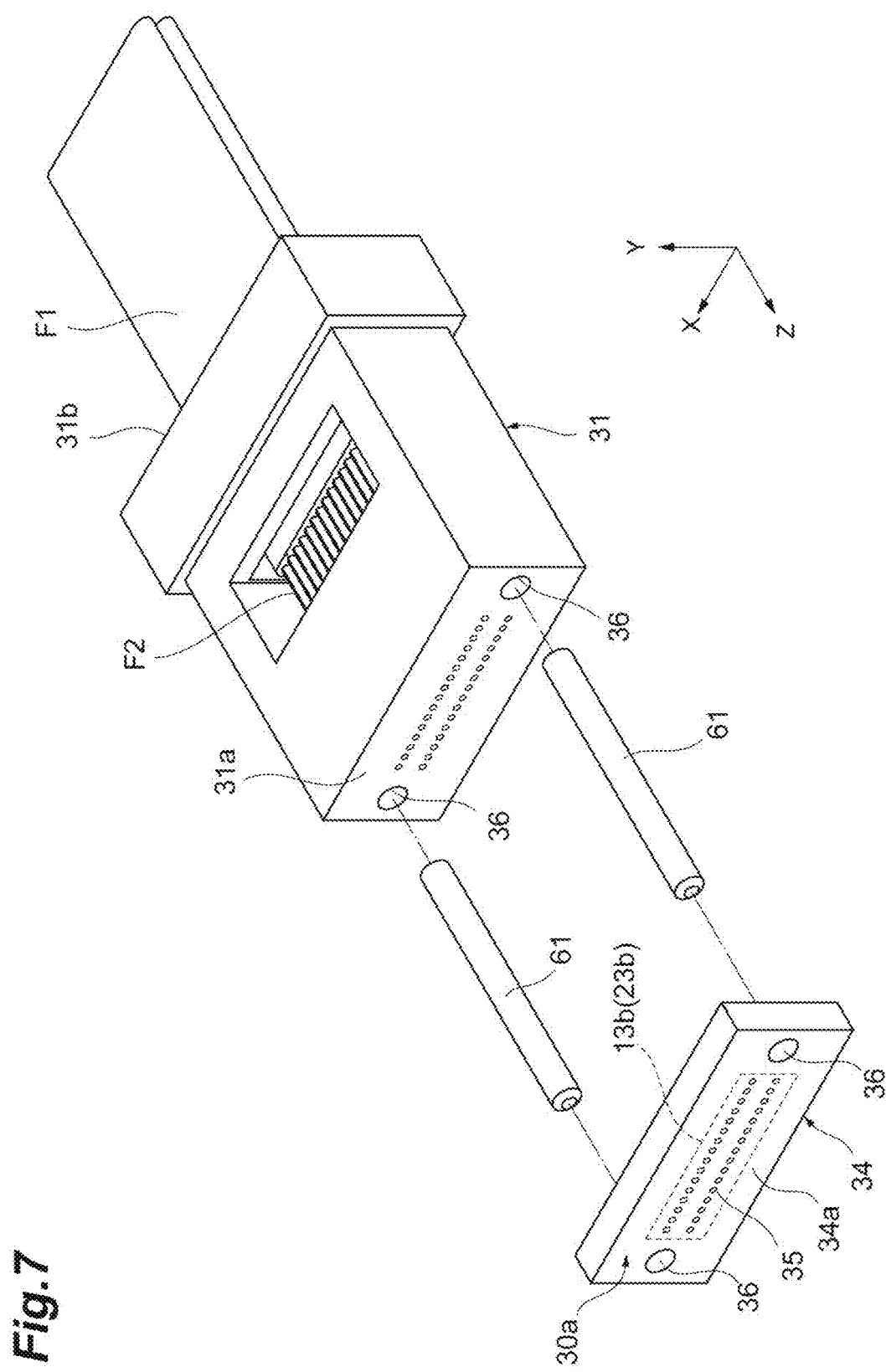
FIG. 7 is a perspective view for describing a part of a process of manufacturing the ferrule.

FIG. 7 is a perspective view for describing a part of a process of manufacturing the ferrule 30. When attaching the GRIN lens array 34 to the front end face 31a of the ferrule main body part 31, the relative positions of the ferrule main body part 31 and the GRIN lens array 34 are fixed by a jig guide pin 61. While keeping the state, the adhesive agent interposed between the front end face 31a and the back surface 34b is cured.

At the time, accuracy of a relative position relation of the ferrule main body part 31 and the GRIN lens array 34 is important. If the ferrule main body part 31 and the GRIN lens array 34 were shifted from each other, an optical axis of the optical fibers F2 and an optical axis of the GRIN lenses 35 would be shifted from each other. In that case, the optical axis of the light beam emitted from the optical fibers F2 would be bent by the GRIN lenses 35 and would be inclined to the Z direction which was a connecting direction.

When the light beam of the enlarged diameter is transferred between the receptacle ferrule 13 and the plug ferrule 23, and/or when the light beam is emitted in parallel with the Z direction which is the connecting direction as in the present embodiment, it is resistant to axial deviation of the receptacle ferrule 13 and the plug ferrule 23, as described above. However, when the light beam is inclined relative to the Z direction and emitted, connection loss due to the axial deviation becomes large. When the optical axis of the light beam is preset to be inclined to the Z direction, if an inclination angle of the optical axis deviates from a desired angle, the connection loss becomes large.

Then, in order to improve positioning accuracy of the ferrule main body part 31 and the GRIN lens array 34, it is preferable to use a guide pin for single mode connection as a jig guide pin 61. The guide pin for the single mode connection is the one for which the difference between the inner diameter of the guide pin hole 36 and the outer diameter of the guide pin is equal to or smaller than 1 μm. When the outer diameter of the guide pin changes in an axial direction, the outer diameter of the guide pin here is an average value of the outer diameter in the axial direction. Thus, position deviation of the ferrule main body part 31 and the GRIN lens array 34 becomes equal to or smaller than 1 μm, and the connection loss due to the axial deviation can be effectively reduced.

After the ferrule main body part 31 and the GRIN lens array 34 are connected, the jig guide pin 61 is detached. Thus, even though the highly accurate guide pin for the single mode connection is expensive, it can be repeatedly used and the manufacturing cost can be reduced.

(First Modification)

Figure 8:
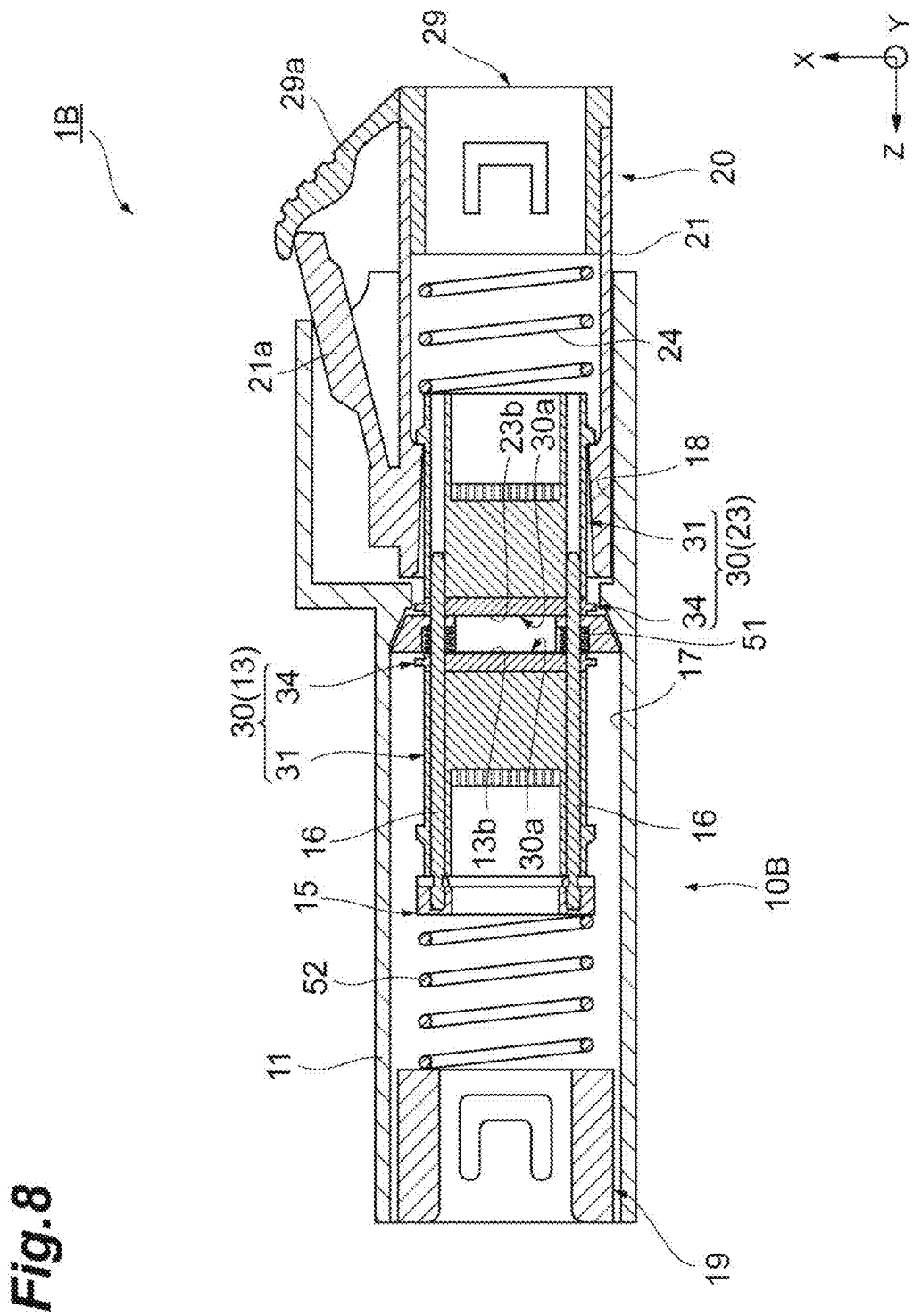
FIG. 8 is a sectional view illustrating the optical coupling structure according to a first modification.

FIG. 8 is a sectional view illustrating an optical coupling structure 1B according to the first modification of the embodiment. FIG. 8 illustrates the second state after coupling. A difference between the present modification and the embodiment is a structure of a receptacle connector 10B for floating the receptacle ferrule 13.

As illustrated in FIG. 8, the receptacle connector 10B of the present modification further includes an elastic member 52 in addition to the structure of the receptacle connector 10A. The elastic member 52 is provided between the support member 19 and the pin keeper 15 inside the cavity 17. The elastic member 52 is an example of a first elastic member in the present modification, and urges the receptacle interface part 13b toward the cavity 18. Then, in the second state, by the plug ferrule 23 pushing the spacer 14 and the receptacle ferrule 13, the elastic member 52 is contracted more than in the first state. Thus, the position of the receptacle interface part 13b in the Z direction is moved to the opposite side to the plug connector 20.

The elastic force of the elastic member 52 is set to be greater than the elastic force of the elastic member 51 provided in the spacer 14, and to be roughly equal to or greater than the elastic force of the elastic member 24 provided in the plug connector 20. Thus, the elastic member 51 can be surely contracted in the second state. Even when tensile force is applied to the optical cable F1 in the second state, since the elastic member 52 can be expanded and contracted, an optical coupling state of the receptacle ferrule 13 and the plug ferrule 23 can be maintained. Thus, reliability of the optical coupling structure 1B against the tensile force to the optical cable F1 can be further improved.

Furthermore, according to the present modification, the receptacle ferrule 13 and the plug ferrule 23 are turned to the floating state, and the configuration becomes such that the external force is not easily transmitted to the coupling part. The optical coupling part of the receptacle interface part 13b and the plug interface part 23b can be easily arranged at the back of the receptacle housing 11.

In the present modification, since the elastic members 52 and 24 are arranged between the support members 19 and 29 and the ferrules 13 and 23 in both of the receptacle connector 10B and the plug connector 20, sufficient resistance against the tensile force in the Z direction is realized. However, when desired resistance is low, only one of the elastic members 52 and 24 may be arranged. For example, in the modification, the elastic member 24 of the plug connector 20 can be omitted.

(Second Modification)

Figure 9:
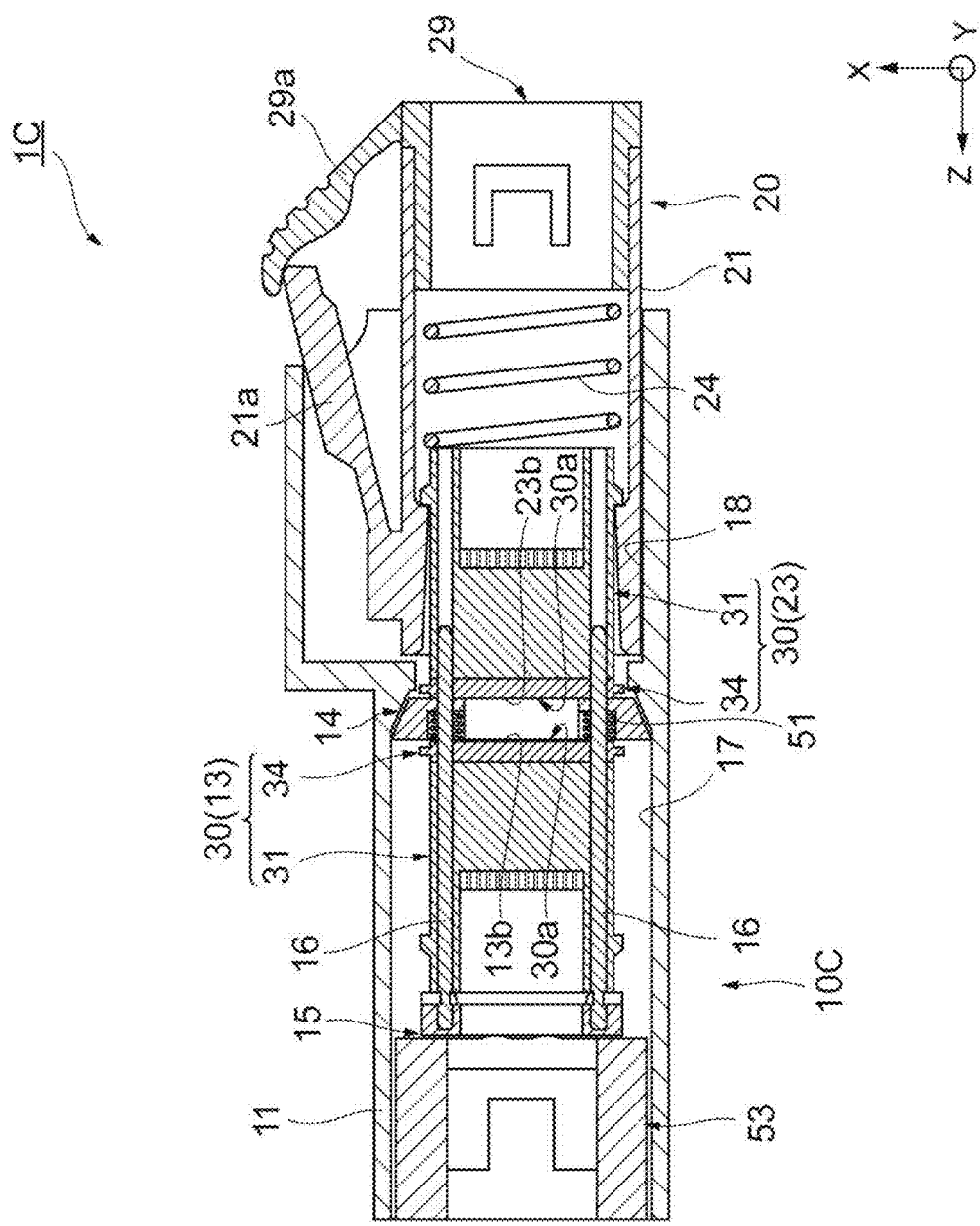
FIG. 9 is a sectional view illustrating the optical coupling structure according to a second modification.

FIG. 9 is a sectional view illustrating an optical coupling structure 1C according to the second modification of the embodiment. FIG. 9 illustrates the second state after coupling. A difference between the present modification and the embodiment is a structure of a receptacle connector 10C for floating the receptacle ferrule 13.

As illustrated in FIG. 9, the receptacle connector 10C of the present modification includes an elastic member 53 instead of the support member 19 of the receptacle connector 10A. The elastic member 53 is fixed to the receptacle housing 11 inside the cavity 17, and is arranged at a position where the receptacle ferrule 13 is pinched with the plug connector 20 in the Z direction. Then, the elastic member 53 elastically supports the receptacle ferrule 13 through the pin keeper 15. The elastic member 53 is an example of a second elastic member in the present modification. In the second state, by the plug ferrule 23 pushing the spacer 14 and the receptacle ferrule 13, the elastic member 53 is contracted more than in the first state. Thus, the position of the receptacle interface part 13b in the Z direction is moved to the opposite side to the plug connector 20.

Figure 10:
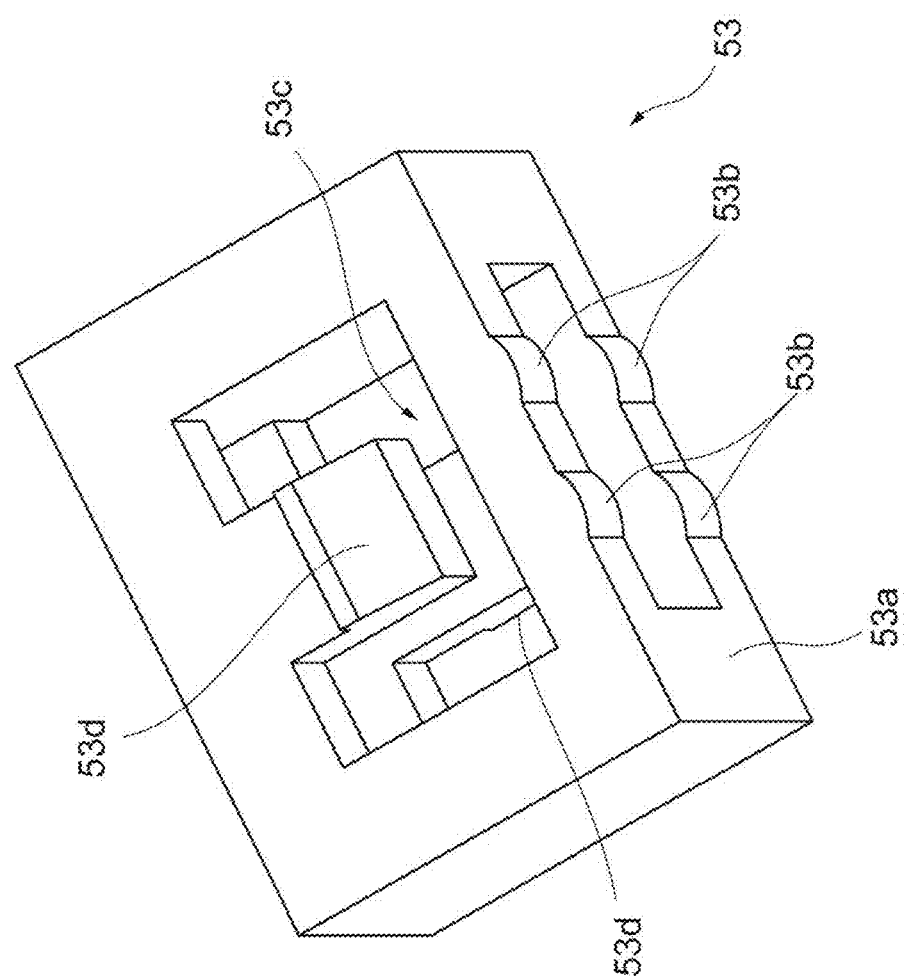
FIG. 10 is a perspective view magnifying and illustrating an elastic member in the second modification.

FIG. 10 is a perspective view magnifying and illustrating the elastic member 53. To the elastic member 53, a structure which is easily elastically deformable in at least a part is introduced. Specifically, the elastic member 53 has a roughly rectangular parallelepiped outer shape, and a projection part 53b for the pin keeper 15 to be in contact is provided on a surface 53a facing the pin keeper 15. Thus, the force in the Z direction applied to the receptacle ferrule 13 is concentrated on a specific part (projection part 53b) of the elastic member 53. A space part 53c is provided on a back side of the projection part 53b, and the part of the elastic member 53 including the projection part 53b is made movable in the Z direction. The elastic member 53 further includes a pawl part 53d, and by the pawl part 53d engaging with the receptacle housing 11, the elastic member 53 is fixed to the receptacle housing 11.

The elastic force of the elastic member 53 is set to be greater than the elastic force of the elastic member 51 provided in the spacer 14, and to be roughly equal to or greater than the elastic force of the elastic member 24 provided in the plug connector 20. Thus, the elastic member 51 can be surely contracted in the second state. Even when the tensile force is applied to the optical cable F1 in the second state, since the elastic member 53 can be expanded and contracted, the optical coupling state of the receptacle interface part 13b and the plug interface part 23b can be maintained. Thus, the reliability of the optical coupling structure 1C against the tensile force to the optical cable F1 can be further improved.

The receptacle connector 10C of the present modification is the one for which elasticity is given to the support member 19 of the embodiment and the elastic member 52 of the first modification is omitted. Thus, since the effects similar to that of the first modification can be obtained while suppressing the number of parts, a cost can be reduced, and a length in the Z direction of the receptacle connector 10C can be shortened.

(Third Modification)

Figure 11:
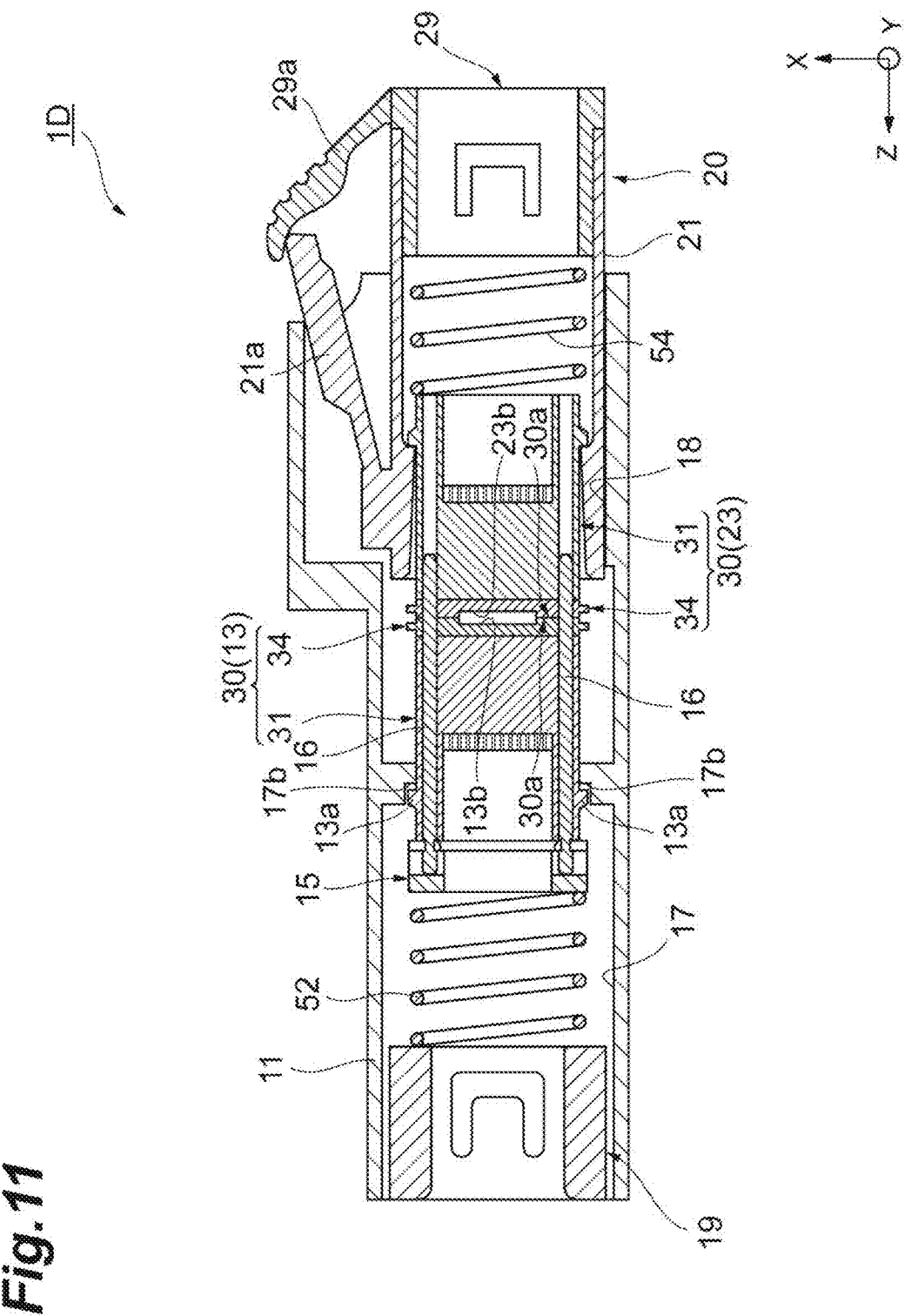
FIG. 11 is a sectional view illustrating the optical coupling structure according to a third modification.

FIG. 11 is a sectional view illustrating an optical coupling structure 1D according to the third modification of the embodiment. FIG. 11 illustrates the second state after coupling. A difference between the present modification and the first modification is a configuration for positioning the receptacle ferrule 13 inside the receptacle housing 11, to be more in detail, the configuration for positioning it in the Z direction.

In the present modification, the spacer is not provided between the receptacle ferrule 13 and the plug ferrule 23, and in the second state, the front end 30a of the receptacle ferrule 13 and the front end 30a of the plug ferrule 23 are in contact with each other. That is, the receptacle interface part 13b and the plug interface part 23b are recessed to the front surface 34a of the GRIN lens array 34. Then, by the front surfaces 34a of such GRIN lens arrays 34 being in contact with each other, the receptacle interface part 13b and the plug interface part 23b face each other at an interval.

The cavity 17 of the receptacle housing 11 is provided with a surface 17b to be in contact with a part 13a of the receptacle ferrule 13 in the first state. The surface 17b restricts the movement of the receptacle ferrule 13 urged by the elastic member 52, and positions the receptacle ferrule 13 in the Z direction. Thus, the receptacle interface part 13b is held inside the cavity 17. Then, in the second state, the elastic member 52 is slightly pushed back by the receptacle ferrule 13 being pushed to the plug ferrule 23, and the surface 17b and the part 13a are held in a state at an interval. Note that, even in the state, the receptacle interface part 13b is positioned inside the cavity 17.

As in the present modification, the receptacle housing 11 may include the part (surface 17b) that holds the optical coupling surface (front surface 34a) of the receptacle ferrule 13 inside the cavity 17 by being in contact with the part 13a of the receptacle ferrule 13. Thus, similarly to the embodiment, the sticking of the dirt and the dust to the optical coupling part of the receptacle interface part 13b and the plug interface part 23b can be reduced and the decline of the optical coupling efficiency can be suppressed. While an example that the part 13a is provided in the ferrule main body part 31 is illustrated in FIG. 11, the part 13a may be provided in the GRIN lens array 34.

Figure 12:
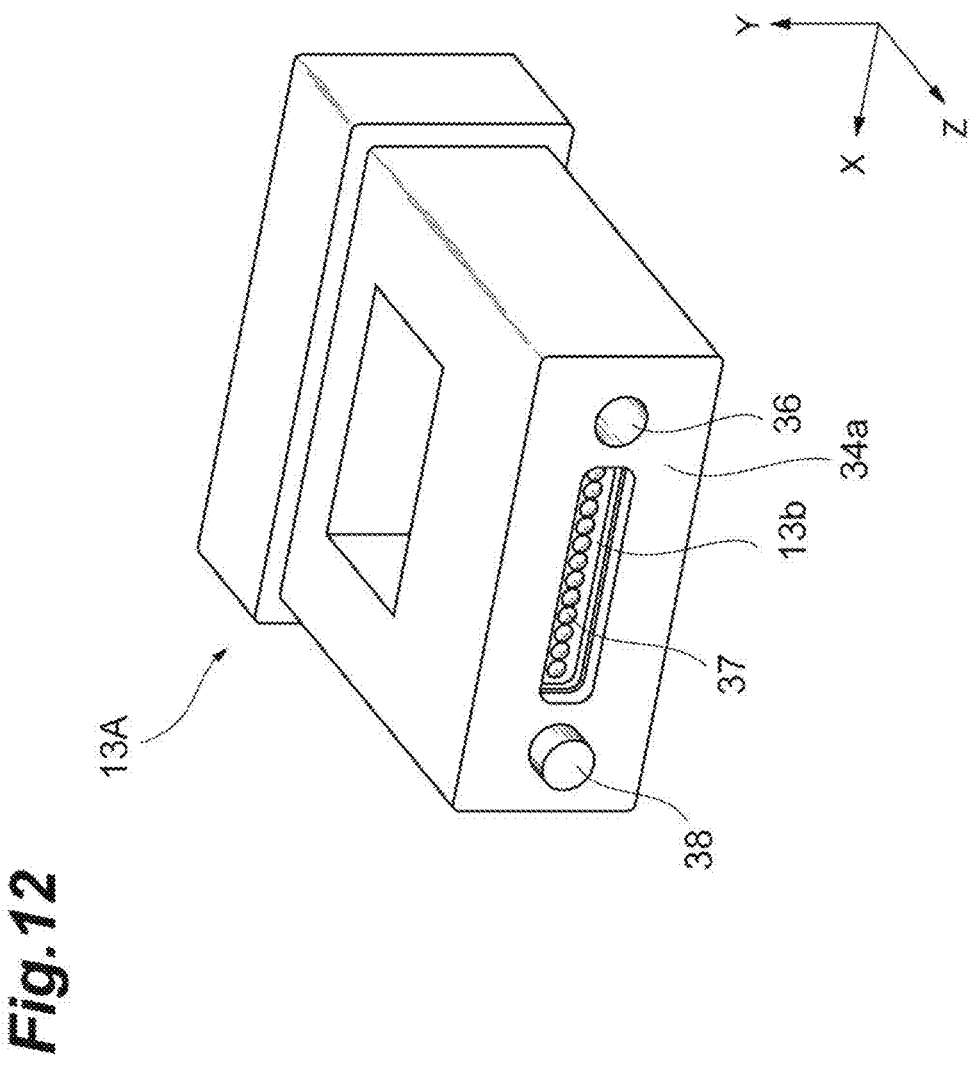
FIG. 12 is a perspective view illustrating an example of further modifying the receptacle ferrule in the third modification.

FIG. 12 is a perspective view illustrating an example of further modifying the receptacle ferrule 13 of the present modification. For a receptacle ferrule 13A illustrated in FIG. 12, the receptacle interface part 13b is integrally configured in the ferrule main body part 31 illustrated in FIG. 11. In such a configuration, by forming the receptacle ferrule 13A by a resin material (polyether imide, for example) transparent to a communication wavelength, the holding part holding the end of the optical fiber F2, an optical element and the receptacle interface part 13b can be easily formed. A lens (optical element) 37 of the receptacle ferrule 13A is a convex lens made of a resin for example. The lens 37 is formed in the receptacle interface part 13b inside a recessed part formed at a position recessed from the front surface 34a, and the recessed part is deeper than a height of the lens 37. Thus, the front end of the receptacle ferrule 13A functions as the spacer. Further, a guide pin 38 may be also configured integrally with the receptacle ferrule 13A. In this case, need of the pin keeper 15 illustrated in FIG. 8 can be eliminated.

REFERENCE SIGNS LIST 1A-1D . . . optical coupling structure, 10A-10C . . . receptacle connector, 11 . . . receptacle housing, 13 . . . receptacle ferrule, 13b . . . receptacle interface part, 14 . . . spacer, 15 . . . pin keeper, 16 . . . guide pin, 17 . . . first cavity, 18 . . . second cavity, 19, 29 . . . support member, 20 . . . plug connector, 21 . . . plug housing, 23 . . . plug ferrule, 23b . . . plug interface part, 24 . . . elastic member, 29 . . . support member, 30 . . . ferrule, 31 . . . ferrule main body part, 32 . . . introducing part, 33 . . . holding hole, 34 . . . GRIN lens array, 34a . . . front surface, 35 . . . GRIN lens, 36 . . . guide pin hole, 51-53 . . . elastic member, 61 . . . jig guide pin, F1 . . . optical cable, F2 . . . optical fiber.

What is claimed is:

1. A receptacle connector holding an end of a first optical fiber and optically coupling the first optical fiber and a second optical fiber and configured to be connected with a plug connector that is configured to hold an end of the second optical fiber, the receptacle connector comprising:
   a receptacle ferrule; and
   a receptacle housing including a first cavity housing the receptacle ferrule and a second cavity configured to house the plug connector,
   wherein the receptacle ferrule includes
   a front end,
   a holding part holding the end of the first optical fiber, and
   a receptacle interface part optically coupled with the end of the first optical fiber, configured to face a plug interface part of the plug connector, enlarging a light beam emitted from the first optical fiber and emitting the light beam from the front end,
   wherein an opening area of the first cavity on a cross section vertical to an inserting direction of the plug connector to the receptacle housing is smaller than an opening area of the second cavity on the cross section vertical to the inserting direction,
   wherein the receptacle interface part and the plug interface part define a first state before being optically coupled and a second state after being optically coupled, and the receptacle interface part is positioned inside the first cavity in the second state,
   wherein the receptacle housing further includes a spacer provided between the receptacle interface part and the plug interface part, the spacer including an outer peripheral surface having a tapered shape that gradually narrows toward the second cavity,
   wherein the spacer is urged toward the second cavity,
   wherein an inner wall of the receptacle housing includes a part holding the receptacle interface part inside the first cavity by being in contact with the outer peripheral surface of the spacer, in the first state, and
   wherein in the second state, compared to the first state, a relative position of the spacer to the receptacle interface part in the inserting direction is moved to a side of the receptacle interface part such that the outer peripheral surface of the spacer and the part of the inner wall of the receptacle housing are separated.

2. The receptacle connector according to claim 1, wherein the receptacle interface part is positioned inside the first cavity also in the first state.

3. The receptacle connector according to claim 1, wherein, in the second state, compared to the first state, a position of the receptacle interface part in the inserting direction is moved to a side opposite to the plug connector.

4. The receptacle connector according to claim 1, wherein an inner wall of the receptacle housing includes a part holding the receptacle interface part inside the first cavity by being in contact with the receptacle ferrule.

5. The receptacle connector according to claim 1, further comprising:
   a support member arranged at a position where the receptacle ferrule is pinched between the plug connector and the support member in the inserting direction, the support member supporting the receptacle ferrule and restricting movement of the receptacle ferrule to a side opposite to the plug connector; and a first elastic member arranged between the support member and the receptacle ferrule, wherein, the first elastic member is contracted more in the second state than in the first state.

6. The receptacle connector according to claim 1, further comprising a second elastic member arranged at a position where the receptacle ferrule is pinched between the plug connector and the second elastic member in the inserting direction, the second elastic member supporting the receptacle ferrule and being fixed to the receptacle housing, wherein, the second elastic member is contracted more in the second state than in the first state.

7. The receptacle connector according to claim 1, wherein the second cavity houses at least a part of a latch lever of the plug connector.

8. The receptacle connector according to claim 1, further comprising a rod-like guide pin to position the receptacle ferrule and the plug ferrule by inserting a part into a first guide pin hole of the receptacle ferrule and inserting the other one part into a second guide pin hole of the plug ferrule, wherein the first optical fiber is a single mode optical fiber, and wherein a difference between an outer diameter of the guide pin and an inner diameter of the first guide pin hole and the second guide pin hole is a difference used for connection of a multimode optical fiber.

9. An optical coupling structure comprising the receptacle connector according to claim 1 and the plug connector, wherein the plug connector includes a plug ferrule including the plug interface part and a plug housing the plug ferrule, wherein the plug interface part is optically coupled with the receptacle interface part, and wherein a distal end of the plug housing is positioned inside the second cavity and the plug interface part is positioned inside the first cavity, in the second state.

10. An optical coupling structure comprising:

the receptacle connector according to claim 1; and a plug connector comprising a plug housing and a plug ferrule including a plug interface and held inside the plug housing, wherein the plug interface is optically coupled with the receptacle interface when the plug connector is inserted into the second cavity of the receptacle connector and is in contact with the second surface of the spacer.

* * * * *